United States Patent Office 3,574,197
Patented Apr. 6, 1971

3,574,197
PROCESS OF PRODUCING 1-HYDROXY-7α-METHYL-ESTRADIOL DERIVATIVES
Klaus Prezewowsky and Rudolf Wiechert, Berlin, Germany, assignors to Schering AG, Berlin, Germany
No Drawing. Filed July 9, 1968, Ser. No. 743,315
Int. Cl. C07c 173/00
U.S. Cl. 260—239.55                        18 Claims

ABSTRACT OF THE DISCLOSURE 1-hydroxy-17α-methyl-estradiol derivatives of the general formula

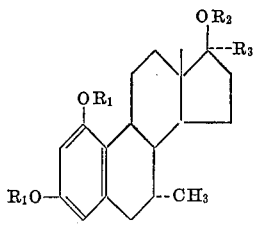

wherein $R_1$ and $R_2$ represent identical or different and designate hydrogen, a lower alkyl or saturated oxygen-heterocyclic radical or a physiological harmless acid radical, and $R_3$ represents hydrogen or a saturated or unsaturated lower alkyl radical, characterized in that as known in a manner in itself in 1-hydroxy-7α-methyl estrone, whose hydroxy groups may alternatively be present in esterified or etherified form, hydrogen or a saturated or unsaturated, possibly halogenated hydrocarbon is added to the 17-positioned keto groups, and subsequently free esterified or etherified hydroxy groups are hydrolytically divided, esterified or etherified, depending on the ultimately desired significance of $R_1$ and $R_2$, are produced such as by the addition of hydrogen to the 17-positioned carbonyl group in the D ring by hydration in the presence of a catalyst.

GENERAL DESCRIPTION OF THE INVENTION

The invention relates to 1-hydroxy-7α-methyl-estradiol derivatives of the general formula

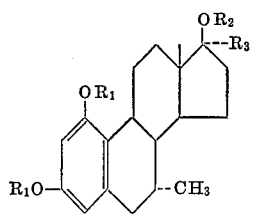

wherein $R_1$ and $R_2$ represent identical or different and designate hydrogen, a lower alkyl or saturated oxygen-heterocyclic radical or a physiologically harmless acid radical, and $R_3$ represents hydrogen or a saturated or unsaturated lower alkyl radical, and a process for their production, characterized in that, as known in a manner known in itself, in 1-hydroxy-7α-methyl-estrone, whose hydroxy groups may alternatively be present in esterified or etherified form, hydrogen or a saturated or unsaturated, possibly halogenated hydrocarbon is added to the 17-positioned keto groups, and subsequently free esterified or etherified hydroxy groups are hydrolytically divided, esterified or etherified, depending on the ultimately desired significance of $R_1$ and $R_2$.

As physiologically harmless ester radicals, there enter into consideration radicals of acids which are commonly used in steriod chemistry for the esterification of free hydroxyl groups; as examples of such acids there may be mentioned acetic acid, propionic acid, hydroxy- and chloro-propionic acids, cyclopentyl propionic acid, caproic acid, enanthic acid, undecylic acid, benzoic acid, mono- and dichloro-acetic acid, trimethyl acetic acid, succinic acid, etc.

In view of the pharmaceutical use of the products of the process, there are suitable as ether radicals, preferably methyl, ethyl, and tertahydropyranyl radicals.

As saturated or unsaturated lower alkyl radical ($R_3$) there enters into consideration for example, the methyl, ethyl, butyl, vinyl, ethinyl, or butadiinyl radical. The hydrocarbon radical may generally be substituted and may constitute the chloroethylinyl radical.

The new compounds are produced according to methods known in themselves such as follows:

The addition of hydrogen to the 17-positioned carbonyl group may be effected by hydrogenation in the presence of a common catalyst such as platinum oxide which in the presence of hydrogen brings about the reduction of five-ring ketones. In addition, the hydrogen may be transferred to the 17-ketone from metal hydrides. Mixed metal hydrides such as sodium borohydride, lithium-aluminum hydride, and lithium-tri-tertiary-butoxy-aluminum hydride have proved successful hydrogen donors.

The alkylation of the 17-keto group is effected preferably with Grignard reagents or alkali alkyls, for example lithium alkyl.

For the alkinylation; alkyne, chloroalkyne or alkadiyne and an alkali metal are caused to act on the 17-ketone in a suitable solvent, preferably a tertiary alcohol or ammonia, preferably under elevated pressure. Chloralkyne and alkadiyne are advantageously formed during the reaction from halogenated alkenes or from halogenated alkynes with alkali.

Suitable solvents are for example ether, such as diethyl ether, tetrahydrofurane and dioxane, or hydrocarbons, such as benzene and toluene. As tertiary alcohols there enter into consideration for use tertiary butyl and tertiary amyl alcohol.

Instead of alkali metal alkynylide there may be used alkynyl magnesium halide.

A 17α-alkynyl group introduced by Grignardization or similarly may if desired be reduced subsequently to the alkenyl or alkyl group.

As 1-hydroxy-7α-methyl estrone, being a resorcinol derivative, is not a very stable compound in an alkaline medium, it may be desirable to start with compounds in which the hydroxy groups are esterified or etherified, in 1- and 3-position. If, for example, the ether radicals are to be introduced only as intermediate protective groups, it is advantageous to etherify with dihydropyrane, because these radicals are particularly easy to split off after completed reaction.

It is to be noted that 1,3-diesters are easily attacked during the conversion at the 17-keto group.

The reduction may alternatively be carried out so that ester groups present in the starting product are preserved. On the other hand, hydroxy groups liberated during the alkylation or alkynylation may be selectively reacylated in the 1- and/or 3-position.

The acylation in 1- and 3-position is effected preferably with pyridine acid anhydride at room temperature. For etherification in 1- and 3-position there serve as alkylizing compounds, preferably diazomethane and dialkyl sulfates.

For the esterification of the 17β-hydroxy group in the 1,3-diesters and 1,3-diethers obtained, acid anhydrides, for example, are allowed to react with the steroid in the presence of strong acids, such as p-toluolsulfonic acid or pyridine/acid anhydride, at elevated temperature. The last-named methods may alternatively be used in order to convert the free trihydroxy compound directly into the triacylate. From the triacylates, the 1- and the 3-OH group can be liberated by gentle, partial saponification.

1,3-diesters and 1,3-diethers can be converted with dihydropyrane in the presence of a strong acid, such as p-toluolsulfonic acid, to the corresponding 17-tetra-hydropyranyl ethers. The etherification of the 17-OH-group in the 1,3-diethers according to the invention with an alkyl radical is performed preferably with alkyl halides in liquid ammonia. The last two methods also permit etherifying all three OH groups of the trihydroxy compound in one operation.

From 1,3-diacyl-17-tetrahydropyranyl derivatives the 1 and the 3 OH group can be liberated by alkaline saponification.

If one wishes to get to 1,3,17β-trihydroxy compounds whose 17-OH group is alkylated or acylated, it is particularly advantageous to etherify the 1-hydroxy-estrone with dihydropyrane, to introduce the desired alkyl or acyl radical into the 17β-OH group obtained after the reduction or respectively the alkylation or alkynylation, and then to split off selectively the tetrahydropyranyl groups from 1,3-position. Afterward the obtained 1,3-dihydroxy compounds can be etherified or esterified in the desired manner.

The products of the process possess valuable therapeutic properties. For example, they excel in surprisingly strong estrogenic and ovulation-inhibiting activities. The compounds can be given by mouth as well as parenterally.

The following table shows the great superiority of the new compounds over estradiol-3-acetate (II) and 17α-ethinylestradiol-3-acetate (IV) in oral application in animal experiments. The estrogenic effect was determined on castrated female rats in the Allen-Doisy test. The ovulation-inhibiting effect was determined on normal female rats by tube inspection; as $WD_{50}$ is stated the daily dose which suppresses ovulation in 50% of the animals.

TABLE

| Substance | Allen-Doisy test threshold value (γ) | Ovulation inhibition $WD_{50}(\gamma)$ |
|---|---|---|
| (I) 7α-methyl-1,3,5(10)-estratriene-1,3,17β-triol-1,3-diacetate | 30 | 300 |
| (II) Estradiol-3-acetate (for comparision) | 300 | 300–1,000 |
| (III) 17α-ethinyl-7α-methyl-1,3,5(10)-estratriene-1,3,17β-triol-1,3-diacetate | 1 | 10 |
| (IV) 17α-ethinyl-estradiol-3-acetate (for comparison) | 10 | 30–100 |

Further the new compounds are distinguished by the inhibition of implantation (nidation). The occurred resp. not occurred implantation of blastocytes was determined on rats by uterus inspection. Daily from the first to the seventh day of gravidity certain doses of the substance to be tested were perorally administered to gravid rats. On the ninth day the animals were killed. The number of animals having had no implantation was determined. The following table shows at which percentage of the animals the implantation is inhibited per dose.

TABLE

| Dose (p.o.) γ/animal/ day | Percentage of the animals with inhibited implantation | |
|---|---|---|
| | 17α-ethinyl-7α-methyl-1,3,5(10)-estratriene-1,3,17β-triol-1,3-diacetate | 17α-ethinyl-estradiol (for comparison) |
| 32 | 100 | 95 |
| 16 | 100 | 30 |
| 8 | 100 | 20 |
| 4 | 100 | 0 |
| 2 | 100 | |
| 1 | 90 | |

The table proves the new compound 17α-ethinyl-7α-methyl-1,3,5(10)-estratriene-1,3,17β-triol - 1,3 - diacetate to be thirty times more effective than the control substance 17α-ethinyl-estradiol.

For therapeutic use, the new estratriol derivatives are processed with additions customary in Galenic pharmacy, vehicle substances and taste correctives, by methods known in the art, to form the usual medicament forms. For oral applications where there enter into consideration in particular tablets, dragees, capsules, pills, suspensions or solutions, and for parenteral application in particular oily solutions, for example, sesame oil or castor oil solutions, which may possibly contain in addition a diluent, such as benzyl benzoate or benzyl alcohol. The concentration of the active ingredient in the medicaments thus formulated is, of course, dependent also on the form of application; thus tablets contain about 20γ and oily solutions, for intramuscular injection per ml. about 50γ of active substance.

Areas of indication of the medicaments on the basis of the compounds of the invention are symptoms where a treatment with estrogen, possibly in combination with gestagenically active substances, is indicated. There may be mentioned as an example climacterium and its consequential diseases, disorders in the peripheral blood supply, amenorrhea; in particular in combination with, for example, norethisterone acetate, the compounds according to the invention are suitable also for inactivating the ovary.

The 1-hydroxy-7α-methyl-estrone serving as starting material of the present process and not yet described in the literature is produced as follows; it being understood that this is an illustrative example:

To the suspension of 42 g. of 7α-methyl estrone (produced by hydrolysis of the 3-tetrahydropyranyl ether) in 600 ml. of glacial acetic acid, add 120 g. of lead tetraacetate and agitate for 16 hours at room temperature with exclusion of moisture. Then charge the batch in 600 of iced water, suction-filter the precipitate, wash same with water, and take up the filter residue in methylene chloride. Wash the substance solution with sodium bicarbonate solution and water until neutral, dry and concentrate. Filter the concentrate with methylene chloride over 400 g. of silica gel+10% water. Combine the substance-containing fractions and remove the solvent. One obtains 7 g. of 7α-methyl-$\Delta^{1,4}$-estradiene-10β-ol - 3,17 - dione-acetate, which after recrystallization from diethyl ether melts at 198–199 deg. C.

UV: $\epsilon_{205}=5{,}050$; $\epsilon_{248}=12{,}500$

A suspension of 13.0 g. of 7α-methyl-$\Delta^{1,4}$-estradiene-10β-ol-3,17-dione-acetate in 125 ml. of acetic acid anhydride is admixed by drops with 0.7 ml. of concentrated sulfuric acid and agitated for 3 hours at room temperature, the substance going slowly into solution. Then the batch is charged in 10 times the quantity of iced water, to which are added 7 g. of sodium carbonate, stirring 1 hour and filtering. The washed and dried residue is recrystallized from methanol. One obtains 7 g. of 7α-methyl-$\Delta^{1,3,5(10)}$-estratriene-1,3-diol-17-on-1,3 - diacetate, which after recrystallization from methylene chloride/hexane melts at 166–166.5 deg. C.

UV: $\epsilon_{205}=23{,}500$; $\epsilon_{266}=380$

EXAMPLE 1

(a) To the solution of 2.7 g. of 7α-methyl-$\Delta^{1,3,5(10)}$-estratriene-1,3-diol-17-on-1,3,diacetate in 60 ml. of absolute tetrahydrofurane there are added 5.5 g. of lithium-tri-tertiary-butoxy-aluminum hydride, with agitation and external cooling. Let the mix react for half an hour at 0 deg. C and then carefully add 13 ml. of glacial acetic acid. Dilute with ether, extract the organic phase with ice-cold, dilute hydrochloric acid, and then wash with sodium bicarbonate solution and water until neutral. After drying over sodium sulfate and evaporation of the solvent, one obtains 2 g. of 7α-methyl-$\Delta^{1,3,5(10)}$-estratriene-1,3,17β-triol-1,3,diacetate, which after recrystallization from hexane/diethyl ether melts at 160–162 deg. C.

UV: $\epsilon_{266}=435$; $\epsilon_{310}=200$ (b) 1 g. 7α-methyl-$\Delta^{1,3,5(10)}$-estratriene-1,3-diol-17-on-1,3-diacetate is hydrogenated in 25 ml. of glacial acetic acid with 20 mg. of platinum oxide at normal pressure and room temperature to absorption of 1.1 mole equivalent of hydrogen, then the solution is filtered off the catalyst and evaporated in a rotary evaporator to dryness. The residue is taken up in methylene chloride, washed with sodium bicarbonate solution and water until neutral, dried and evaporated. One obtains 900 mg. of 7α-methyl-$\Delta^{1,3,5(10)}$-estratriene-1,3,17β-triol - 1,3 - diacetate, which after recrystallization from hexane/diethyl ether melts at 160–162 deg. C.

UV: $\epsilon_{266}$=435; $\epsilon_{310}$=200

EXAMPLE 2

The solution of 1.5 g. of 7α-methyl-$\Delta^{1,3,5(10)}$-estratriene-1,3,17β-triol-1,3-diacetate in 70 ml. of benzene is dried azeotropically by distillation of 20 ml. of solvent. In like manner the solution of 15 mg. of p-toluosulfonic acid is 20 ml. of benzene is freed from moisture. After cooling to 0 deg. C., the two solutions are combined, added with 1 ml. of dihydropyrane, and stirred for 1.5 hours. Then it is washed with sodium bicarbonate and water, then dried, and evaporated. One obtains 1.4 g. of 7α-methyl-$\Delta^{1,3,5(10)}$-estratriene-1,3,17β-triol - 1,3 - diacetate - 17β-tetrahydropyranyl ether as a chromatographically homogeneous oil.

UV: $\epsilon_{207}$=16,800; $\epsilon_{266}$=394

EXAMPLE 3

3 g. of 7α-methyl-$\Delta^{1,3,5(10)}$-estratriene-1,3,17β-triol-1,3-diacetate-17β-tetrahydropyranyl ether are dissolved in 100 ml. of methanol by heating, and the solution is cooled again while stirring. To this is added a solution of 1.3 g. of potassium carbonate in 13 ml. of water and stirred for 1.5 hours under nitrogen at room temperature. The saponification batch is charged into 10 times the quantity of ice-cold saturated sodium chloride solution and neutralized exactly with glacial acetic acid. Filter the precipitate, wash with water and dry under a vacuum. One obtains 1.2 g. of 7α-methyl-$\Delta^{1,3,5(10)}$-estratriene-1,3,17β-triol-17β-tetrahydropyranyl ether as a chromatographically homogeneous oil.

UV: $\epsilon_{206}$=35,100; $\epsilon_{281}$=2,080; $\epsilon_{285}$=2,050

EXAMPLE 4

1.5 g. of 7α-methyl-$\Delta^{1,3,5(10)}$-estratriene-1,3,17β-triol-1,3-diacetate are dissolved in 5 ml. of pyridine, admixed with 5 ml. of acetic acid anhydride, and heated on the steam bath for 1 hour. Then charge the batch in 10 times the quantity of iced water, filter the precipitate, and dry in vacuum. One obtains 1.4 g. of 7α-methyl-$\Delta^{1,3,5(10)}$-estratriene-1,3,17β-trioltriacetate as a chomatographically homogeneous oil.

UV: $\epsilon_{206}$=20,700; $\epsilon_{266}$=371

EXAMPLE 5

2.7 g. of 7α-methyl-$\Delta^{1,3,5(10)}$-estratriene-1,3-diol-17-one-1,3-diacetate are heated to boiling in 50 ml. of methanol with 5 ml. of dilute hydrochloric acid (1:1) for 2.5 hours under nitrogen. Then cool, stir into 500 ml. of ice-cold sodium chloride solution, filter the residue, and dry over phosphorus pentoxide under vacuum at 50 deg. C. One obtains 2 g. of 7α-methyl-$\Delta^{1,3,5(10)}$-estratriene-1,3-diol-17-on.

UV: $\epsilon_{208}$=37,100; $\epsilon_{281}$=2,070; $\epsilon_{286}$=2,120

To the solution of 2.2 g. of 7α-methyl-$\Delta^{1,3,5(10)}$)estratriene-1,3-diol-17-on in 25 ml. of absolute tetrahydrofurane add 12.5 ml. of dihydropyrane and 500 mg. of p-toluolsulfonic acid. Let the mixture react for 36 hours at room temperature and for 8 hours at 50 deg. C. Then add 2 ml. of pyridine and concentrate the solution in a rotary evaporator. Take up the residue in ether, wash the solution with water, dry and evaporate. There are obtained 2.5 g. of 7α-methyl-$\Delta^{1,3,5(10)}$-estratriene-1,3-diol-17-on-1,3-bis-tetrahydropyranyl ether.

UV: $\epsilon_{208}$=31,600 (final absorption); $\epsilon_{277}$=1,750; $\epsilon_{281}$=1,770

From 1.67 g. of magnesium shavings and 4.3 ml. of methyl iodide prepare a Grignard solution in 50 ml. of ether. To this add dropwise, the solution of 3 g. of 7α-methyl - $\Delta^{1,3,5(10)}$ - estratriene - 1,3 - diol-17-on-1,3-bis-tetrahydropyranyl ether in 50 ml. of absolute benzene. Stir for 4 hours at room temperature, cool to 0 deg. C. and decompose with ammonium chloride solution. Then separate the organic phase and extract the aqueous phase with ether several times. Combine the ether phases, wash them with water, dry and evaporate. One obtains 1.2 g. of 7α,17α-dimethyl-$\Delta^{1,3,5(10)}$-estratriene-1,3,17β-triol-1,3-bis-tetrahydropyranol ether.

UV: $\epsilon_{208}$=31,500; $\epsilon_{277}$=1,780; $\epsilon_{271}$=1,710

EXAMPLE 6

From 8.3 g. of magnesium shavings and 26.1 ml. of ethyl bromide prepare a Grignard solution in 120 ml. of absolute tetrahydrofurane, from which one obtains the acetylene magnesium bromide compound by introduction of acetylene for 1 to 2 hours. To this suspension add dropwise a solution of 2 g. of 7α-methyl-$\Delta^{1,3,5(10)}$-estratriene-1,3-diol-17-on-1,3-diacetate in 50 ml. of tetrahydrofurane and stir this mixture for 20 hours at 70 deg. C. under argon. After cooling, decompose the reaction mixture with saturated aqueous ammonium chloride solution, separate the organic phase, and extract the aqueous phase with ether several times. The combined organic phases are washed with saturated sodium chloride solution and dried over sodium sulfate. The residue remaining after evaporation of the solvent is chromatographed over silica gel. One elutes with benzene/acetic ether (8:2) 17α-ethinyl-7α-methyl-$\Delta^{1,3,5(10)}$-estratriene-1,3,17β-triol.

UV: $\epsilon_{207}$=38,200; $\epsilon_{286}$=2,050

EXAMPLE 7

2 g. of 17α-ethinyl-7α-methyl-$\Delta^{1,3,5(10)}$-estratriene-1,3,17β-triol are dissolved in 5 ml. of pyridine while cooling and admixed with 5 ml. of acetic acid anhydride. The reaction solution is let stand for 15 hours at room temperature and subsequently charged into 10 times the quantity of iced water. Suction-filter the precipitate, wash with water, dry and recrystallize from diisopropyl ether and methylene chloride. One obtains 2 g. of 17α-ethinyl-7α-methyl-$\Delta^{1,3,5(10)}$-estratriene, 1,3,17β - triol - 1,3-diacetate of the melting point 140–141 deg. C.

UV: $\epsilon_{207}$=18,800; $\epsilon_{266}$=401

EXAMPLE 8

A mixture of 3 g. of 17α-ethinyl-7α-methyl-$\Delta^{1,3,5(10)}$-estratriene-1,3,17β-triol-1,3-diacetate, 15 ml. of pyridine, and 10 ml. of acetic acid anhydride is heated for 10 hours in an oil bath (bath temperature 150 deg. C.) under nitrogen. After cooling to room temperature, the batch is charged in iced water, stirring for 1 hour and then filtering the percipitate, washing with water, and drying. One obtains 17α-ethinyl - 7α - methyl-$\Delta^{1,3,5(10)}$-estratriene-1,3,17β-triol-1,3,17β-triacetate.

UV: $\epsilon_{205}$=38,300; $\epsilon_{284}$=2,100

EXAMPLE 9

The solutions of 1.2 g. of 17α-ethinyl-7α-methyl-$\Delta^{1,3,5(10)}$-estratriene - 1,3,17β - triol-1,3-diacetate in 70 ml. of benzene and of 10 mg. of p-toluolsulfonic acid in 20 ml. of benzene are evaporated to half the volume, cooled, combined, and admixed with 1 ml. of dihydropyrane. This mixture is stored for 1 hour at room temperature, then extracted with ice cold sodium bicarbonate solution and washed with water until neutral. After drying with sodium sulfate and removal of the solvent one obtains 1.1 g. of 17α-ethinyl-7α-methyl-$\Delta^{1,3,5(10)}$-estratriene-1,3,17β-triol-1,3-diacetate - 17β-tetrahydropyranyl ether.

UV: $\epsilon_{207}$=16,800; $\epsilon_{266}$=394

EXAMPLE 10

1.5 g. of 17α-ethinyl-7α-methyl-Δ$^{1,3,5(10)}$-estratriene-1,3,17β-triol-1,3-diacetate - 17β - tetrahydropyranyl ether are saponified as described in Example 3 to 17αethinyl-7α-methylΔ$^{1,3,5(10)}$ - estratriene-1,3,17β-triol-17β-tetrahydropyranyl ether.

UV: $\epsilon_{206}=35,100$; $\epsilon_{281}=2,070$; $\epsilon_{285}=2,050$

EXAMPLE 11

To a solution of 1.3 g. of 17α-ethinyl-7α-methyl-Δ$^{1,3,5(10)}$ - estratriene-1,3,17β-triol-17β-tetrahydropyranyl ether in 150 ml. of ether one adds an ethereal diazomethane solution until the yellow color remains intact for a prolonged time. Then let the reaction solution stand for 16 hours, destroy the excess diazomethane with glacial acetic acid, and drive out the solvent. One obtains 1.2 g. of 17α-ethinyl-7α-methyl - Δ$^{1,3,5(10)}$ - estratriene-1,3-17β-triol-1,3-dimethyl ether - 17β-tetrahydropyranyl ether.

UV: $\epsilon_{205}=38,100$; $\epsilon_{284}=2,050$

EXAMPLE 12

There are charged in about 300 ml. of liquid ammonia at —80 to —60 deg. C., after addition of a trace of iron(III)-nitrate, 13.8 of sodium in small pieces, waiting for the blue color to disappear before each addition. After the addition of alkali metal, there are slowly added in drops 24.6 g. of 1,4-dichlorobutin-(2), continuing to stir for 30 minutes. Thereafter one adds 4.8 g. of 7α - methyl-Δ$^{1,3,5(10)}$-estratriene-1,3-diol-17-on-1,3-bis-tetrahydropyranyl ether in 50 ml. of absolute tetrahydrofurane and stirs for 2 hours at —40 deg. C. Then decompose with ammonium chloride and evaporate the ammonia at room temperature. The residue is taken up in methylene chloride, and the solution is washed with water, dried and evaporated. One obtains 3.8 g. of 17α-butadiinyl-7α-methyl - Δ$^{1,3,5(10)}$ - estratriene-1,3,17β-triol-1,3-bis-tetrahydropyranyl ether.

UV: $\epsilon_{206}=31,700$; $\epsilon_{253}=500$; $\epsilon_{285}=170$; $\epsilon_{305}=155$

EXAMPLE 13

To 1.1 g. of lithium shavings in 400 ml. of absolute ether there are added in drops 11.4 g. of methyl iodide in 200 ml. of absolute ether. After short heating, cool to 0 deg. C and under nitrogen gas add 40 g. of trans-dichloroethylene in 100 ml. of absolute ether within 30 minutes. Remove the cooling bath and stir the reaction mixture for 1.5 hours at room temperature. To this solution of lithium chloroacetylene add 4.6 g. of 7α-methyl-Δ$^{1,3,5(10)}$-estratriene - 1,3 - diol-17-on-1,3-bis-tetrahydropyranyl ether in 150 ml. of absolute toluol within 30 minutes. Heat the mixture for 1.5 hours to boiling while stirring. After cooling to 0 deg. C., the reaction mixture is decomposed with a saturated aqueous ammonium chloride solution and extracted with ether. The ethereal phase is washed with water and dried over sodium sulfate. After vaporization of the solvent one obtains 2.5 g. of 17α-chlorethinyl-7α-methyl - Δ$^{1,3,5(10)}$ - estratriene-1,3,17β-triol-1,3-bis-tetrahydropyranyl ether.

UV: $\epsilon_{208}=31,600$; $\epsilon_{277}=1,730$; $\epsilon_{281}=1,760$

EXAMPLE 14

To the solution of 1 g. of 17α-butadiinyl-7α-methyl-Δ$^{1,3,5(10)}$-estratriene-1,3,17β-triol - 1,3 - bis-tetrahydropyranyl ether in 15 ml. of methanol, there is added the aqueous solution of 1 g. of oxalic acid in 3 ml. of water, and the mixture is heated to boiling for 1 hour. Then place the batch in ice-cold sodium chloride solution, suction-filter the precipitate, wash the filter residue with water, and dry under vacuum. One obtains 0.7 g. of 17-butadiinyl-7α-methyl-Δ$^{1,3,5(10)}$-estratriene-1,3,17β-triol.

UV: $\epsilon_{207}=38,100$; $\epsilon_{288}=2,080$

EXAMPLE 15

1.5 g. of 17α-ethinyl-7α-methyl-Δ$^{1,3,5(10)}$-estratriene-1,3,17β-triol-1,3-bis-tetrahydropyranyl ether are acetylized, as described in Example 8, to 17α-ethinyl-7α-methyl-Δ$^{1,3,5(10)}$-estratriene - 1,3,17β - triol-1,3-bis-tetrahydropyranyl ether-17β-acetate.

UV: $\epsilon_{208}=31,300$; $\epsilon_{277}=1,770$; $\epsilon_{280}=1,720$

EXAMPLE 16

1.1 g. of 17α-ethinyl-7α-methyl-Δ$^{1,3,5(10)}$-estratriene-1,3,17β-triol-1,3-bis-tetrahydropyranyl ether -17β-acetate are subjected to ether splitting, as described in Example 14. One obtains 17α-ethinyl-7α-methyl-Δ$^{1,3,5(10)}$-estratriene-1,3,17β-triol-17β-acetate.

UV: $\epsilon_{206}=38,300$; $\epsilon_{285}=2,040$

EXAMPLE 17

A solution of 1.9 g. of 17α-ethinyl-7α-methyl-Δ$^{1,3,5(10)}$-estratriene-1,3,17β-triol-1,3-diacetate in 50 ml. of diethyl ether is admixed with 1 g. of Lindlar catalyst and hydrated to the absorption of 1 mole equivalent of hydrogen. Then filter from the catalyst and distill the solvent. One obtains 1.8 g. of 17α-vinyl-7α-methyl-Δ$^{1,3,5(10)}$-estratriene-1,3,17β-triol-1,3-diacetate.

UV: $\epsilon_{204}=10,200$; $\epsilon_{275}=470$

It will be apparent from the above illustrative examples that we have produced derivatives of 1-hydroxy-7α-methyl estradiol which excel in strong estrogenic and ovulation inhibiting activities and may be given orally or parenterally.

We claim:
1. Compounds of the general formula

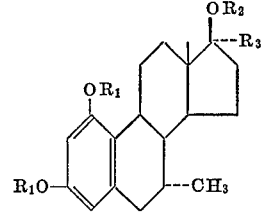

wherein $R_1$ and $R_2$ are identical or different members selected from the group consisting of hydrogen, lower alkyl, tetrahydropyranyl, and a physiologically harmless organic acyl and $R_3$ is selected from the group consisting of hydrogen lower alkyl, lower alkenyl and lower alkinyl.

2. A compound having the general formula set forth in claim 1 and comprising 7α-methyl-Δ$^{1,3,5(10)}$-estratriene-1,3,17β-triol-1,3-diacetate.

3. A compound having the general formula set forth in claim 1 and comprising 7α-methyl-Δ$^{1,3,5(10)}$-estratriene-1,3,17β-triol-1,3-diacetate-17β-tetrahydropyranyl ether.

4. A compound having the general formula set forth in claim 1 and comprising 7α-methyl-Δ$^{1,3,5(10)}$-estratriene-1,3,17β-triol-17β-tetrahydropyranyl ether.

5. A compound having the general formula set forth in claim 1 and comprising 7α-methyl-Δ$^{1,3,5(10)}$-estratriene-1,3,17β-triol-triacetate.

6. A compound having the general formula set forth in claim 1 and comprising 7α,17α-dimethyl-Δ$^{1,3,5(10)}$-estratriene-1,3,17β-triol-1,3-bis-tetrahydropyranyl ether.

7. A compound having the general formula set forth in claim 1 and comprising 17α-ethinyl-7α-methyl-Δ$^{1,3,5(10)}$-estratriene-1,3,17β-triol.

8. A compound having the general formula set forth in claim 1 and comprising 17α-ethinyl-7α-methyl-Δ$^{1,3,5(10)}$-estratriene-1,3,17β-triol-1,3-diacetate.

9. A compound having the general formula set forth in claim 1 and comprising 17α-ethinyl-7α-methyl-Δ$^{1,3,5(10)}$-estratrene-1,3,17β-triol-triacetate.

10. A compound having the general formula set forth in claim 1 and comprising 17α-ethinyl-7α-methyl-Δ$^{1,3,5(10)}$- estratriene-1,3,17β-triol-1,3-diacetate - 17β - tetrahydropyranyl ether.

11. A compound having the general formula set forth in claim 1 and comprising 17α-ethinyl-7α-methyl-Δ$^{1,3,5(10)}$-estratriene-1,3,17β-triol-17β-tetrahydropyranyl ether.

12. A compound having the general formula set forth in claim 1 and comprising 17α-ethinyl-7α-methyl-Δ$^{1,3,5(10)}$-estratriene-1,3,17β-triol-1,3-dimethyl ether - 17β - tetrahydropyranyl ether.

13. A compound having the general formula set forth in claim 1 and comprising 17α - butadiinyl - 7α - methyl-Δ$^{1,3,5(10)}$-estratriene-1,3,17β-triol-1,3 - bis - tetrahydropyranyl ether.

14. A compound having the general formula set forth in claim 1 and comprising 17α-chloroethinyl-7α-methyl-Δ$^{1,3,5(10)}$-estratriene-1,3,17β-triol - 1,3 - bis - tetrahydropyranyl ether.

15. A compound having the general formula set forth in claim 1 and comprising 17α-butadinyl - 7α - methyl-Δ$^{1,3,5(10)}$-estratriene-1,3,17β-triol.

16. A compound having the general formula set forth in claim 1 and comprising 17α-ethinyl-7α-methyl-Δ$^{1,3,5(10)}$-estratriene-1,3,17β-triol - 1,3 - bis-tetrahydropyranyl ether-17β-acetate.

17. A compound having the general formula set forth in claim 1 and comprising 17α-ethinyl-7α-methyl-Δ$^{1,3,5(10)}$-estratriene-1,3,17β-triol-17β-acetate.

18. A compound having the general formula set forth in claim 1 and comprising 17α-vinyl-7α-methyl-Δ$^{1,3,5(10)}$-estratriene-1,3,17β-triol-1,3-diacetate.

References Cited

UNITED STATES PATENTS

| | | | |
|---|---|---|---|
| 3,256,273 | 6/1966 | Cross | 260—239.55 |
| 3,290,297 | 12/1966 | Cross | 260—239.55 |
| 3,318,925 | 5/1967 | Anner et al. | 260—397.4 |
| 3,478,019 | 11/1969 | Edwards | 260—239.55 |

HENRY A. FRENCH, Primary Examiner

U.S. Cl. X.R.

260—397.4, 397.5, 999